US006801216B2

(12) United States Patent
Voticky et al.

(10) Patent No.: US 6,801,216 B2
(45) Date of Patent: Oct. 5, 2004

(54) MAKEOVER SYSTEM

(76) Inventors: Michael Voticky, 1913 Real Catorce, Austin, TX (US) 78746; Richard Hogan, P.O. Box 33771, San Diego, CA (US) 92163; Douglas Lewis, 8336 Center Dr., La Mesa, CA (US) 91942; Christopher J. Kansaki, 16117 Lofty Trail Dr., San Diego, CA (US) 92127

( * ) Notice: Subject to any disclaimer, the term of this patent is extended or adjusted under 35 U.S.C. 154(b) by 197 days.

(21) Appl. No.: 09/791,223

(22) Filed: Feb. 23, 2001

(65) Prior Publication Data

US 2002/0118218 A1 Aug. 29, 2002

(51) Int. Cl.[7] .................................................. G09G 5/00
(52) U.S. Cl. ........................ 345/630; 345/646; 351/227
(58) Field of Search ................................. 345/630, 641, 345/646; 351/204, 227

(56) References Cited

U.S. PATENT DOCUMENTS

| 4,539,585 | A | * | 9/1985 | Spackova et al. .............. 358/93 |
| 4,852,184 | A | * | 7/1989 | Tamura et al. ................. 382/48 |
| 6,142,628 | A | * | 11/2000 | Saigo .......................... 351/204 |
| 6,231,188 | B1 | * | 5/2001 | Gao et al. ..................... 351/227 |

* cited by examiner

Primary Examiner—Matthew Luu
(74) Attorney, Agent, or Firm—Gregory K. Goshorn; Hulsey Grether +Fortkort LLP

(57) ABSTRACT

A makeover system and method for using the system is provided for providing a user with an image of how a person would look with different hair, glasses, makeup, etc. Using a before picture of the person, the system displays an item on the before picture and resizes the item to fit the size of the person according to user input. Therefore, the makeover system can superimpose an item over an image of a person regardless of the size of the image of the person on a computer screen. The system then provides an after picture representing a composite image of the superimposed selected overlay item over the image of the person.

16 Claims, 8 Drawing Sheets

~58

| MAKEOVER SYSTEM NEW CLIENT PROFILE | |
|---|---|
| FIRST NAME | TEXT BOX |
| LAST NAME | TEXT BOX |
| ADDRESS | TEXT BOX |
| CITY | TEXT BOX |
| STATE/PROVINCE | DROP DOWN LIST |
| POSTAL CODE | TEXT BOX |
| COUNTRY | DROP DOWN LIST |
| EMAIL ADDRESS | TEXT BOX |
| PHONE | TEXT BOX |
| FAX | TEXT BOX |
| HAIR PRODUCT LINE | DROP DOWN LIST (make sure to have default other listing) |
| HAIR TEXTURE | DROP DOWN LIST - (Fine, Medium, Coarse, Curly) |
| HAIR TYPE | DROP DOWN LIST - (Dry, Normal, Oily, Chemically Treated) |
| NATURAL LEVEL | DROP DOWN LIST - (Level 1 thru Level 10) |
| % OF GREY | DROP DOWN LIST - (0 to 25%, 25 to 50%, 50 to 75%, 75 to 100%) |
| PREVIOUS COLOR | DROP DOWN LIST - (Yes, No) |
| MAKEUP LINE | DROP DOWN LIST (make sure to have default other listing) |
| NOTES: | TEXT BOX |

<SAVE PROFILE>

--- SITE WIDE MENU OPTIONS GO HERE ---

MakeOver System
Add Before Picture

- CLICK HERE TO ADD YOUR BEFORE PICTURE

Or

- SELECT FROM ONE OF OUR STOCK BEFORE MODELS

| FEMALE 1 | FEMALE 2 | FEMALE 3 | MALE 1 |

--- SITE WIDE MENU OPTIONS GO HERE ---

```
MakeOver Systems

┌─────────────┐
        │  FINISHED   │
        │   AFTER     │
        │  PICTURE    │
        └─────────────┘

COLOR FORMULATION
         (Optional)
        ─ ─ ─ ─ ─ ─
        ─ ─ ─ ─ ─ ─

PRODUCT RECOMMENDATION
        ─ ─ ─ ─ ─ ─
        ─ ─ ─ ─ ─ ─
        ─ ─ ─ ─ ─ ─

--- SITE WIDE MENU OPTIONS GO HERE ---
```

MAKEOVER SYSTEM CONSUMER PROFILE

Please complete this short profile to allow you access to the full consumer features of the makeover system. This information will not be saved by our system to protect your privacy.

| HAIR TYPE | DROP DOWN LIST – DRY, NORMAL, OILY, CHEMICALLY TREATED |
|---|---|
| HAIR TEXTURE | DROP DOWN LIST – FINE, MED, COARSE, CURLY |
| POSTAL CODE | TEXT BOX |

<BEGIN MAKEOVER> ~240

--- SITE WIDE MENU OPTIONS GO HERE ---

Fig. 13

MAKEOVER SYSTEM

FIELD OF THE INVENTION

This invention generally relates to computer imaging, and more particularly, to a tool and technique for digital image processing and manipulating.

BACKGROUND OF THE INVENTION

Traditionally when looking for a new hair style, hat, eyewear, contact lenses, jewelry or makeup, a person visits a store (e.g., department store, salon, jewelry store, specialty store, etc.) that sells the desired product or service. When at the store, the person tries on the article or samples the makeup and observes their new "look" in a mirror. This task can become very time consuming, especially when the person wishes to sample numerous hair styles, glasses, makeup color combinations, etc. For example, a person trying on makeup must first clean their face to remove existing makeup before applying new makeup.

With the aid of computer technology, people can access the Internet and find websites with tools that can electronically change a virtual image of a person. The image can be modified by a program that places a virtual item, such as a pair of glasses, a wig or makeup over the appropriate area of the person's face. This changes the image, which appears as the person with a new "look". Some websites that may provide these features are: makeoverstudio.com, eyeglass.com, beauty-works.com, virtualhair.com, emakeover. com, totalhair.com, virtualmakeover.com, computerhair.com, and newdo.com.

In order to use these Internet tools, a digital image of a person's face must be acquired. The person is directed to take a picture with a camera at a predetermined length. The person's image is taken and used as the before picture of the person. The person is directed to take the picture at a predetermined distance from the camera so that the person's head appears on-screen having a predetermined size. The image of the person's head must be the predetermined size since the hair styles, glasses, makeup, etc., are configured to be of a size to precisely cover a specified area of the person's head in the before picture. For example, the hair styles are virtual wigs drawn to the predetermined size to precisely cover the person's existing hair. That is, the hairstyle wig must have proportions relative to the person's head so that the hair style looks natural over the person's existing hair. Likewise, for an eyewear selection system, the eyeglasses must have a size proportional to the predetermined person's headsize, so that the glasses will not appear too small or too large on the person's face.

These types of systems have problems due to the requirement that the person's head must be a specific size in the before picture. In order to take a picture such that the person's head appears on the before picture at the desired predetermined size, the person likely needs a ruler or tape measure to measure the distance between the person and the camera. If that person's head is smaller or larger than average, then that person will have to adjust accordingly so that their head appears as the desired size on the computer screen. This may take several attempts, since the person will not inherently know the exact distance to be away from the camera so that the person's face will appear having the desired size.

With the related art systems, if the size of the person's face is not exactly correct, then the article of clothing or makeup will not be aligned with the person's head, appearing too large or small. Accordingly, the person will not get an accurate image of how they would look with the selected hair style, clothing or makeup, and the resulting image will look unattractive and inaccurate. It therefore would be advantageous to develop a makeover imaging system that allows a user to resize an overlay image to match the size of a person's electronic image, and superimpose the resized image over the person's image so that the overlay fits naturally on the person.

SUMMARY OF THE INVENTION

The invention includes a makeover system arranged for use in modifying images. The makeover system is an aesthetic overlay imaging computer tool including a user interface that permits the user to modify an overlay image and place the modified image over an image of a person.

In one aspect of the invention, a method that permits a user to modify an overlay image in a makeover system is disclosed. The makeover system can be executed on a computer, including a processor, a display unit, a printer, an input device, a memory, and an interface for communicating with the program, preferably via the Internet. The method includes displaying a before picture representing the image of a person, displaying a set of overlay items for selection of one of the items by the user, the set of overlay items corresponding to an area of the person displayed in the before picture, displaying a selected one of the set of overlay items upon selection of the item by the user, resizing the selected overlay item according to user input to align the size of the selected overlay item with the size of the area of the person, superimposing the resized selected overlay item over the before picture according to user input, such that the item may appear to be worn naturally on the person, and providing an after picture representing a composite image of the superimposed selected overlay item over the image of the person. The method may also include displaying categories of the overlay items for selection of any of the categories by the user, the categories of overlay items corresponding to different areas of the person displayed in the before picture, and retrieving the set of overlay items corresponding to the selected category.

In another aspect of the invention, a makeover system that permits the user to modify an overlay item is disclosed. The makeover system includes an approach for displaying a before picture representing the image of the person, an approach for displaying a set of overlay items for selection of one of the items by the user, the set of overlay items corresponding to an area of the person displayed in the before picture, an approach for displaying a selected one of the set of overlay items upon selection of the item by the user, an approach for resizing the selected overlay item according to user input to align the size of the selected overlay item with the size of the area of the person, an approach for superimposing the resized selected overlay item over the before picture according to user input such that the item may appear to be worn naturally on the person, and an approach for providing an after picture representing a composite image of the superimposed selected overlay item over the image of the person.

In a further aspect of the invention, an executable program preferably embodied on a computer readable medium as a tool that permits a user to modify an overly item and place it over an image of a person is disclosed. The executable program includes a source code segment for displaying a before picture representing the image of the person, a source code segment for displaying a set of overlay items for selection of one of the items by the user, the set of overlay items corresponding to an area of the person displayed in the before picture, a source code segment for displaying a selected one of the set of overlay items upon selection of the item by the user, a source code segment for resizing the selected overlay item according to user input to align the size of the selected overlay item with the size of the area of the person, a source code segment for superimposing the resized selected overlay item over the before picture according to user input such that the item may appear to be worn naturally on the person, and a source code segment for providing an after picture representing a composite image of the superimposed selected overlay item over the image of the person.

In still another aspect of the invention, a computer data signal that permits a user to modify an overlay item and place it over the image of a person is disclosed. The computer data signal includes a signal segment for displaying a before picture representing the image of the person, a signal segment for displaying a set of overlay items for selection of one of the items by the user, the set of overlay items corresponding to an area of the person displayed in the before picture, a signal segment for displaying a selected one of the set of overlay items upon selection of the item by the user, a signal segment for resizing the selected overlay item according to user input to align the size of the selected overlay item with the size of the area of the person, a signal segment for superimposing the resized selected overlay item over the before picture according to user input such that the item may appear to be worn naturally on the person, and a signal segment for providing an after picture representing a composite image of the superimposed selected overlay item over the image of the person.

The above-described aspects are preferably provided via a website created and operated according to the present invention with a novel approach as further described below. A significant aspect of the new website is an interactive tool accessible to a user for changing the size of an overlay item to fit the size of a displayed image. The tool preferably includes an indicia of a direction of resizing the item (eg., a resized bar, arrows, a slide bar, buttons, etc.).

BRIEF DESCRIPTION OF THE DRAWINGS

The invention will be described in conjunction with the following drawings in which like-referenced numerals designate like elements, and wherein:

FIG. 7 is a schematic representation of a fourth menu screen of the makeover system in accordance with the preferred embodiment of the invention;

FIG. 8 is a schematic representation of a fifth menu screen of the makeover system in accordance with the preferred embodiment of the invention;

FIG. 12 is a schematic representation of an eighth menu screen of the makeover system in accordance with the preferred embodiment of the invention; and FIG. 13 is a schematic representation of a ninth menu screen of the makeover system in accordance with the preferred embodiment of the invention.

DETAILED DESCRIPTION OF THE PREFERRED EMBODIMENT

Figure 1:
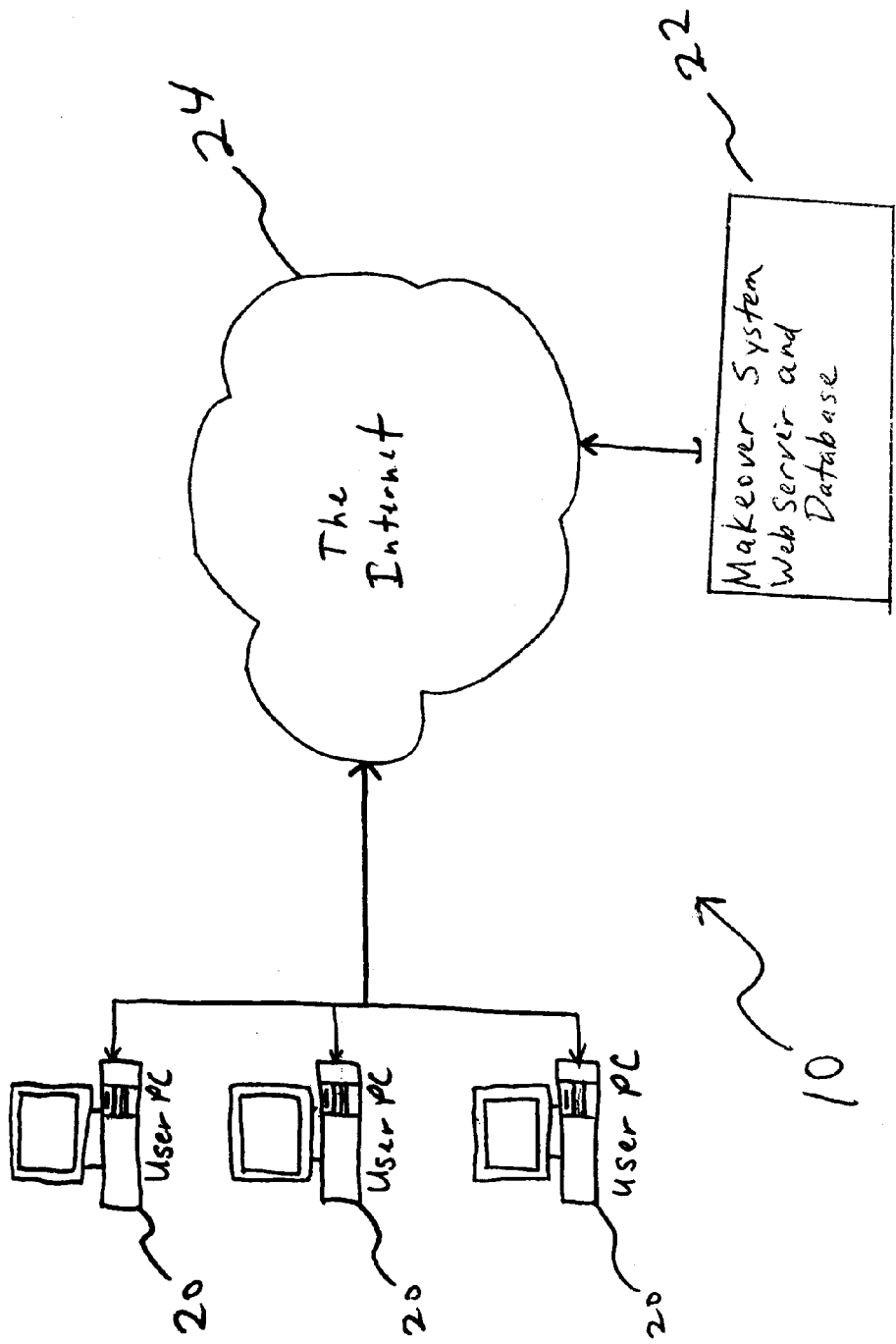
FIG. 1 is a block diagram of an exemplary data processing architecture which is used to implement the makeover system of a preferred embodiment of the invention.

Referring now in greater detail to the various figures of the application, wherein like-referenced characters refer to like parts, a general Internet online environment 10 of the invention is illustrated in FIG. 1. In the online environment 10, user personal computers (PCs) 20 communicate with a makeover system web server and data base (together hereinafter referred to as system server) 22 via the Internet 24. Typically, the user PCs 20 access the Internet 24 through an Internet service provided (e.g., Earthlink) or through an Internet access provider (e.g., Erols, America On Line, etc.) via a communications interface (e.g., modem, cable, telephone line, satellite dish, etc.) and the Internet service/access provider accesses the Internet 24.

The system server 22 executes the makeover system by providing the visual images and instructions, receiving input from the user, and displaying the images with modifications as instructed by the user. The server 22 includes general purpose computer hardware along with computer software designed or tailored for this specific function. The system server 22 can include several servers that cooperate with each other to execute the makeover system, and is accessed by the user via an Internet address. The system server 22 and user PCs 20 communicate according to a protocol supported by the world wide web of the Internet via data packets having a transmission control protocol/Internet protocol (TCP/IP) format. The data packets are typically written in a hypertext markup language (HTML).

The user PCs 20 include general purpose computer hardware along with computer software designed or tailored for this specific function. Preferably, user PCs 20 include computers and Internet access devices (e.g., personal digital assistants (PDAs), televisions, cell phones, pagers) that include an input device (e.g., keyboard, mouse, track ball, joy stick, microphone, pen, remote control device, the like or combinations thereof), an output device (e.g., display unit including video monitor or screen, printer, fax machines), and a network interface (e.g., a modem, cable, communication medium, web browser) for transferring user inputs via the input device to the system server 22.

Figure 2:
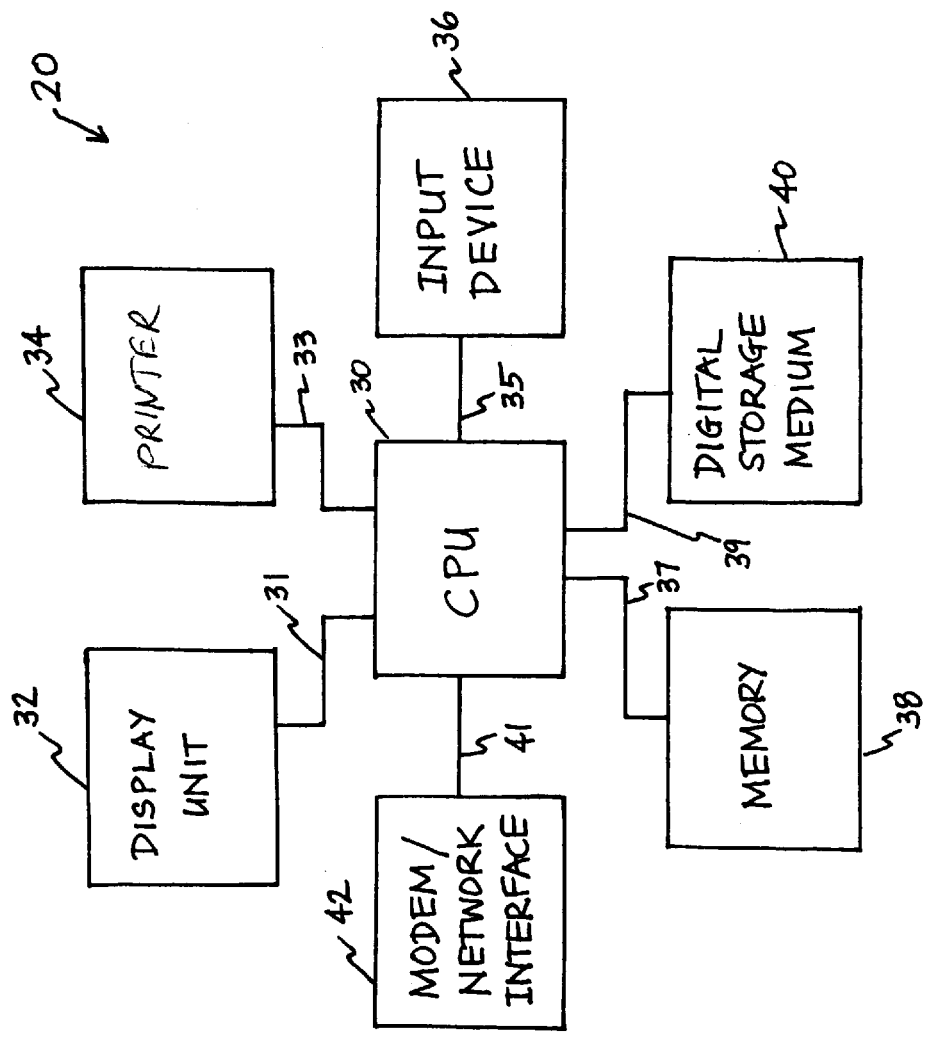
FIG. 2 is a block diagram of an exemplary data processing architecture of the computer which is employed to implement the makeover system of a preferred embodiment of the invention.

FIG. 2 illustrates a block diagram representing a typical embodiment of a user PC 20 arranged for supporting a makeover system of the preferred embodiment of the invention. The user PC 20 includes a central processing unit (CPU) 30 that processes video and sound data as well as other operations required to run the user PC 20. It is understood that a task of the CPU 30 can be performed by a single processor or a number of processors. The user PC 20 also includes a display unit 32 connected via line 31 to the CPU 30 and line 31. The display unit 32 has a size and resolution sufficient to project visual images output via the CPU 30. The display unit 32 is generally a high resolution screen or CRT. A printer 34 is connected via line 33 to the CPU 30 for producing hard copy outputs to the user.

As shown in FIG. 2 the CPU 30 is also connected via line 35 to an input device 36, via line 37 to a memory 38, via line 39 to a digital storage medium 40, and via line 41 to a modem/network interface 42. The input device 36 can be a keyboard, mouse, microphone, joy stick, pen, button, hand tool or combinations of these devices, depending on how the user desires to enter his or her inputs. The memory 38 is in communication with the CPU 30 to store and provide data required by the CPU 30 to operate the user PC 20. The digital storage medium 40 stores the electronic instructions and software necessary for executing the makeover system on the user PC 20. Preferably, the digital storage medium 40 is a hard disc, compact disc, floppy disc, cartridge, network storage unit, a combination thereof, or any other memory capable of storing the electronic instructions and software. As noted above, the modem/network interface 42 provides the communication medium between the user PC 20 and a network or Internet 24, and can include a modem or a network interface (e.g., electrical wire, satellite signal, optical fiber, or a web browser used for linking the user PC 20 to the system server 22 according to TCP/IP protocol).

Figure 3:
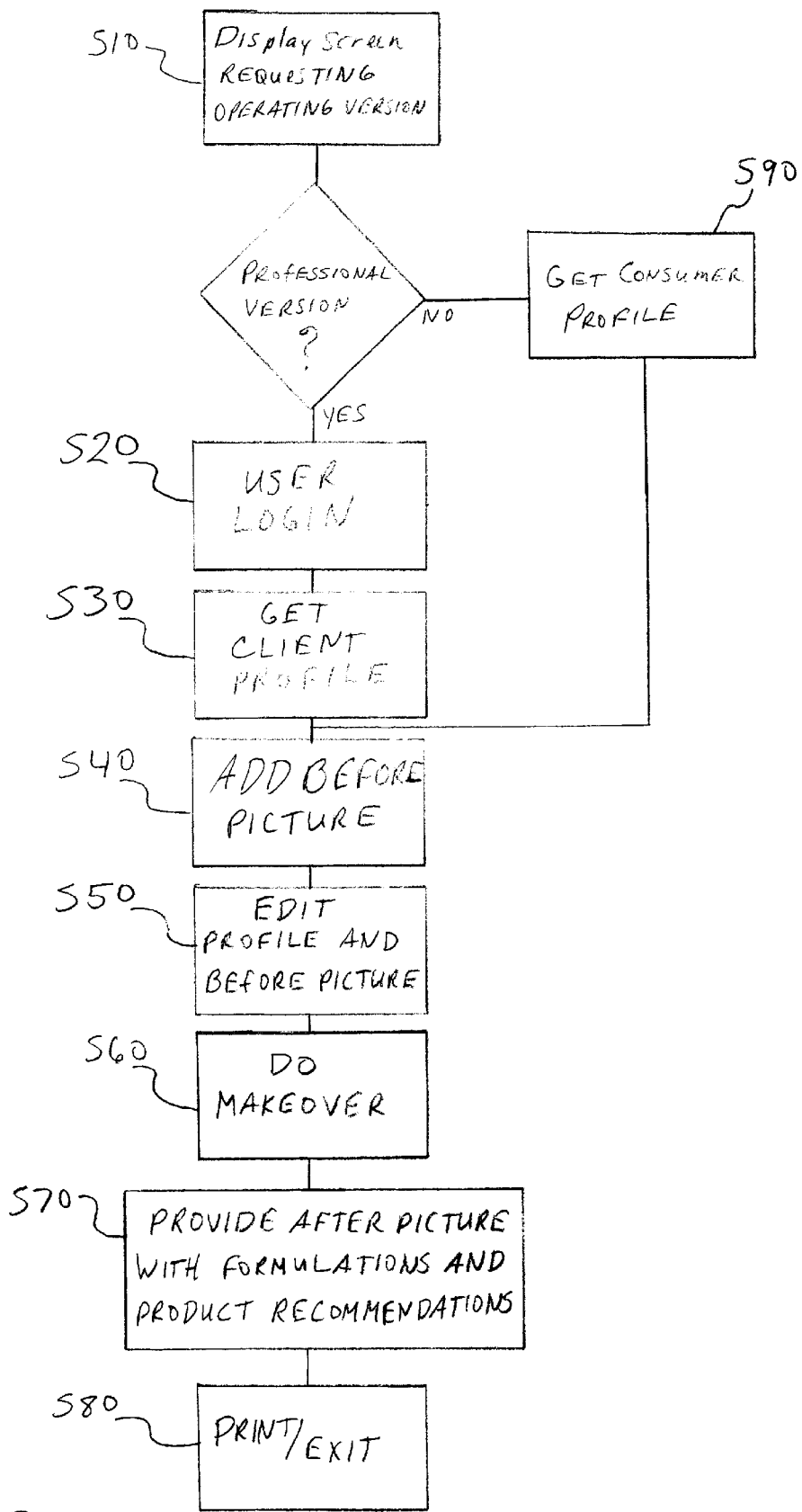
FIG. 3 shows a flow chart illustrating exemplary steps for performing the system in accordance with a preferred embodiment of the invention.
Figure 4:
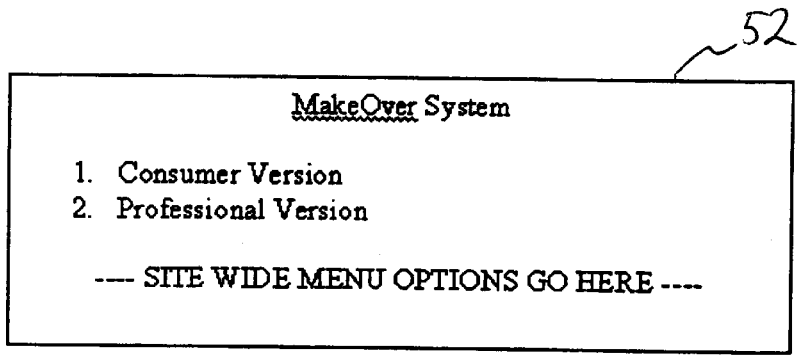
FIG. 4 is a schematic representation of a first menu screen of the makeover system in accordance with the preferred embodiment of the invention.

FIG. 3 shows an exemplary flow overview of a preferred method of the makeover system. After a user locates the website (e.g., everything4Beauty.com) on his or her (for convenience we will refer hereafter to "his"or "her") computer Internet connection, the makeover system outputs a first exemplary menu screen 52, which may be part of the website's home page, at step S10. An example of the first menu screen 52 is shown at FIG. 4. Here the user is invited to select an operating version by clicking into one of the categories (e.g., consumer version, professional version) displayed on the screen.

Figure 5:
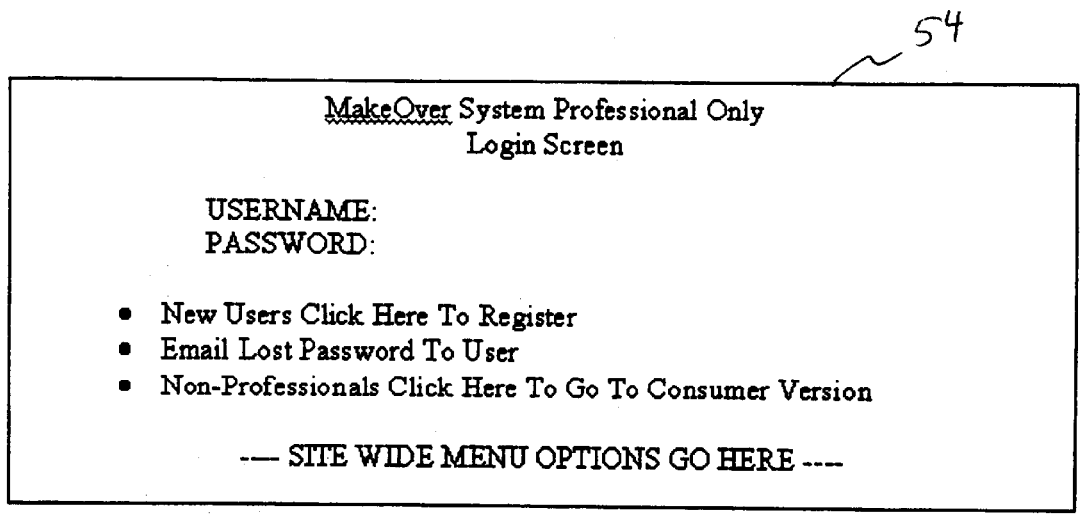
FIG. 5 is a schematic representation of a second menu screen of the makeover system in accordance with the preferred embodiment of the invention.

Depending on the user's selection, the makeover system displays one or more information gathering screens (to be discussed in greater detail below) in a top-down configuration. If the user selected the professional version of the makeover system, then at step S20, the system displays a login screen 54 for access to the professional version. An exemplary login screen 54 is displayed in FIG. 5. As shown, this login screen 54 includes queries for a user name and password for the user. This screen also provides hyperlinks to other screens as described in greater detail below. In particular, this screen shown in FIG. 5 includes a link to login the user upon acceptance of the user name and password by the makeover system. Should the user forget her password, the screen provides a link for the system to email the password associated with the user name to the user. Further, the screen provides a link to the consumer version of the makeover system should the user desire not to enter the professional version.

In addition to the screen options discussed above, the screen shown in FIG. 5 also includes site-wide menu options available to the user. In fact, the site-wide menu options are preferably available to the user from any of the screens discussed herein. Exemplary sitewide menu options include "about us", "view/edit profile", "advertising", "affiliate program", "support", "contact us", and "main menu". The "about us" option links to a screen that provides information about a company that, for example, supports the makeover system. The "view/edit profile" option provides a link to view and edit information of the person whose image will be modified by the makeover system. The "advertising" option provides a link for a person or company to advertise on the screens. The "affiliate program" option provides a link to other programs provided via this website. The "support" option provides a link to support services provided for this system. The "contact us" option provides a link to the company that, for example, supports the makeover system. Finally, the "main menu" option provides a link back to the screen shown at FIG. 4. Preferably these options are positioned on the screens at locations that do not interfere with the operation of other features available to the user (e.g., along the bottom or side edge of the screen). As noted above, these options may also be provided with the other screens disclosed herein to provide the user with several options for moving about the makeover system, as would be readily understood by a skilled artesian.

Figure 6:
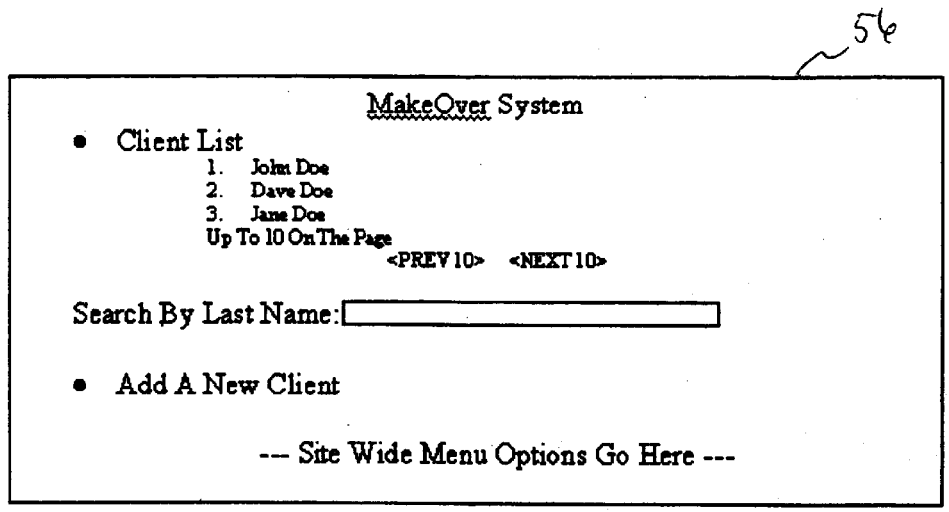
FIG. 6 is a schematic representation of a third menu screen of the makeover system in accordance with the preferred embodiment of the invention.

Upon successful login into the professional version of the system (step S20 in FIG. 5), the makeover system attempts to gather a client profile of the person having the makeover, at step S30. FIG. 6 illustrates a client screen 56 as an exemplary approach for gathering this information. As shown, the client screen 56 provides the user with the options of selecting a client from an assembled client list, searching for the client by name, and adding the person as a new client. If the user decides to select from the client list, the user will select from a list of clients who have been previously stored in a data base of the makeover system. This data base stores the client profile associated with each client in the assembled client list. Preferably, this client list is located under a table "clients" in the data base. The table includes a list of first and last names that are associated with the user's client list along with a profile of each client.

While up to ten names of the client list can be shown at a time on the client screen 56 illustrated in FIG. 6, the user can scroll forward or back to view more names or search for a specific name. It is understood that the number of names displayed at one time is limited only by the font size and arrangement of the names on the screen, and that the number is not critical for the use of this invention.

Still referring to FIG. 6, the search option queries the last name of the client and looks for the name in the data base. If the search option locates the client, then the makeover system outputs a screen (page) showing the client information and a picture of the client (e.g., an add before picture screen (FIG. 8) described in greater detail below). If, at FIG. 6, the user selects "add a new client" then the makeover system proceeds to a new client profile screen (page) 58 as shown, for example, in FIG. 7. FIG. 7 includes a new client profile table arranged for gathering information (e.g., first name, last name, address, phone number, hair texture, hair type, natural level, etc.) of the client. Upon entering the client information, the user can save the profile in the data base and the makeover system proceeds to request a picture of the client.

At step S40, the user enters a before picture of the client or selects from a stock picture stored in the data base. A before picture is an electronic image of the client without makeup, glasses, hats, etc. That is, in the before picture, the client preferably does not have any coverings (e.g., makeup, glasses, hats, etc.) and preferably has his or her hair pulled back to expose the client's face. An exemplary add before picture screen 62 arranged for acquiring the before picture is illustrated in FIG. 7. As shown, the add before picture screen 62 invites the user to select to add a new picture or use a stock picture. If the user selects to add a picture, then the user can select a picture from their computer and transfers the picture to the makeover system via an executable program (e.g., an ActiveX component). This picture can be transferred to the makeover system in most common graphic formats and the Executable program converts the picture to a desired format, resizes the picture to the size of the work area (described below), and saves the picture, preferably in the user's PC memory 38 or digital storage medium 40 for future use by the makeover system.

In particular, at step S40, the makeover system allows a user to input a personal picture into the makeover system, so that the user can use the makeover system on that picture. The user can use a default stock model, which is selected and downloaded from the online server. However, if the user does not wish to do this, then the user may upload his, her or the client's picture for the makeover system to use. Preferably this picture is not saved online; it is save on the user's hard-drive.

If the user decides to select a personal picture from his or her hard-drive, the makeover system displays a drive box (containing the user's hard-drive letters), a folder box (containing the user's file folders), and a file box (containing the user's files). By utilizing these windows for navigation, the user can use the Executable program to find the user's picture on their computer. Using these boxes, the user locates a desired before picture on his or her hard-drive. The picture files are filtered and displayed for the user to easily locate a picture. When the system filters the picture files, it preferably displays only the system supported picture files from the user's hard-drive. These files include: GIF, JPEG, and BITMAP(BMP) files. Technically, when uploaded, the picture is not really being uploaded to the server; instead it is saved on the user's hard-drive. This process is completed by the Executable program.

Once a picture is selected, the user can resize and move the picture proportionally as desired, preferably using a computer mouse and pointer. If the user is satisfied with the result of his or her picture, then he or she may save it for the system to use by clicking the save button. When the save button is clicked, a series of functions are completed, for example, as follows: The system saves the picture as a JPEG in the everything4beauty folder on the user's hard-drive. Using a ".dll" (Dynamic Link) file, the system calls a convert to JPEG function from the ".dll" file to convert a specific picture file to a JPEG file. The ".dll" file is created in Delphi, and compiled as a ".dll" file. The page that the Executable program resides on contains the filename that the picture is to be saved as. Once the picture is saved to the hard-drive, the user has the option to makeover that picture or select a new picture if desired.

Figure 9:
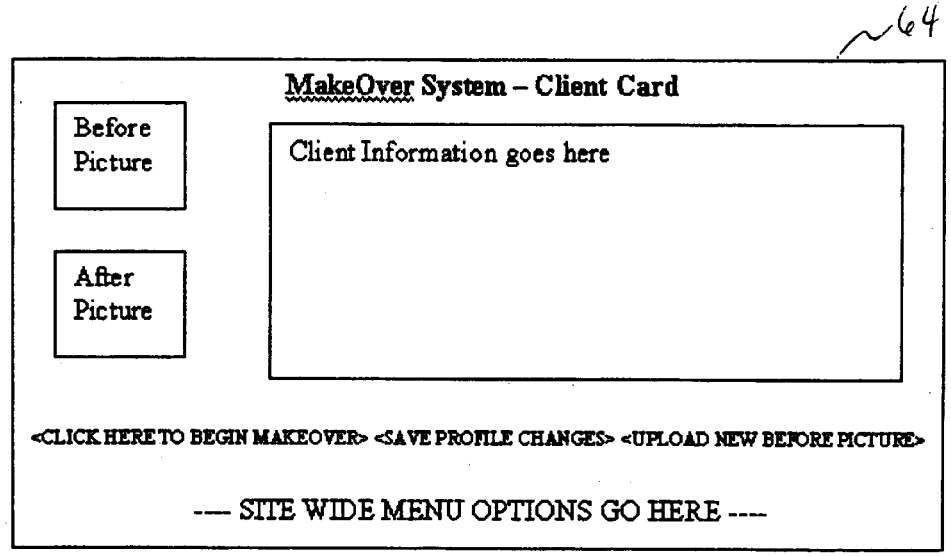
FIG. 9 is a schematic representation of a sixth menu screen of the makeover system in accordance with the preferred embodiment of the invention.

In the preferred embodiment, the Executable program saves two versions of the picture. One version is saved as a before picture, and the other version is saved as a "thumbnail" image for displaying in a client card as shown, for example, in FIG. 9. FIG. 9 shows a client card screen 64 including the "thumbnail" image as the before picture of the client, and information about the client obtained via the client profile. At this time, step S50, the user can select to begin a makeover session, to edit and save the client profile, to upload a new before picture, or to add another client.

As described above, the client information is stored in the data base. When the client card screen 64 is displayed, for example, as shown in FIG. 9, the makeover system uploads the existing client information from the data base into the illustrated client card. The user can instruct the makeover system to modify to the current profile by simply making the changes in the appropriate fields of the profile (FIG. 7) and selecting the "save profile changes" button.

The before picture and an after picture (described below) are preferably loaded from the user's hard drive by retrieving the previously saved before picture and, if applicable, an after picture. If the user selects the option to upload a new before picture (FIG. 9), then the makeover system proceeds back to step S40 and displays a screen (e.g., the add before picture screen 62) appropriate for adding another before picture (FIG. 8). If the user selects the option to begin a makeover session, then the system proceeds to illustrate a screen as shown, for example, in FIG. 10.

The screen shown in FIG. 10, hereinafter also referred to as the do makeover page 200, includes a working area 210, a resize slide bar 212, a category section 214 having category option icons 216, an item section 218 having item option icons 220, an RTOP menu 222, a RMID menu 224, a tools menu 226 and an exit button 228. The do makeover page 200 permits the user to modify the appearance of the person in the before picture by adding graphic layers to the before picture, at step S60.

Figure 11:
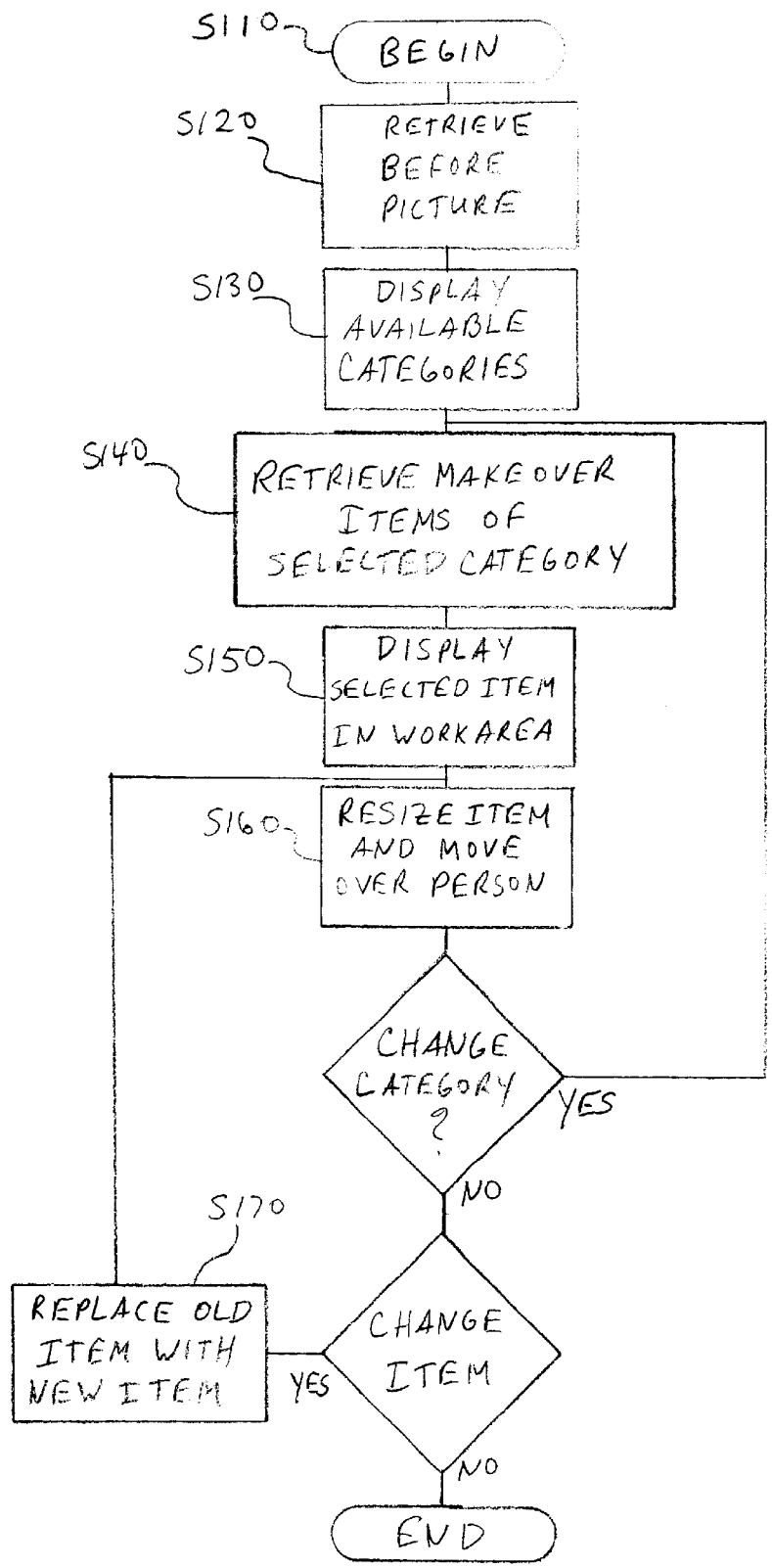
FIG. 11 shows a flow chart illustrating steps for performing a makeover in accordance with the preferred embodiment of the invention.

A preferred approach for performing step S60 is shown in FIG. 11. Upon the user's selection to begin the makeover at step S110, the makeover system displays the do makeover page 200 and retrieves the before picture of a client or customer, at step S120. In particular, the system retrieves the before picture from the user's PC memory 38 or digital storage medium 40 and places the picture in the makeover screen working area 210. This picture has a hierarchical display level (e.g., graphics layer 1) representing the lowest graphic layer in the makeover system working area 210. The makeover item overlays are placed over the before picture described below, and have higher graphic layer numbers corresponding to their relative placement above or below other graphic layers.

At step S130, the makeover system displays a list of available categories in the category option icons 216 along the category section 214. The user then selects a category option from the list of category option icons 216. This selection causes the makeover system at step S140 to retrieve a group of makeover items that may be placed on the before picture. The group of makeover items are displayed in the item option icons 220 along the item section 218. For example, if the user selects a category "short hair styles", then a selection of short hair styles to choose from will appear in the item option icons 220. The user can select a makeover item from the group of items displayed on the page 200.

The user selects an item to place the selected item over the before picture shown in the working area 210. At step S150, the makeover system displays the selected item in the work area as a new graphic layer. Preferably, the system displays the selected item at a peripheral section of the working area 210 away from the image of the person. The image is preferably placed along the periphery of the working area 210 so that it can be modified without affecting the appearance of the person. This feature becomes more important as additional graphic layers are added to the before picture.

The layer number or hierarchy depends on the category of the item. Preferably, the layers are ordered relative to how they would appear on a person in real life. For example, a layer for hair would appear above a layer for glasses, which would appear above a layer of eye shadow. In a preferred embodiment, overlay layers would proceed in the following order from a base layer of a background setting: the before picture, eye shadow, eye liner, blush, lip color, lip liner, glasses, hair, hair highlighter, and accessories (e.g., hats, jewelry). Other layers, such as, earrings, necklace, tattoos, contact lenses, facial hair and clothing can also be incorporated into the previously discussed layering scheme, as would readily be understood by a skilled artesian. It is also understood that the order of the layers are not important unless the items overlap. For example, the relative orders of eye shadow and lip stick are not important to each other because the items do not overlap. However, it is important that the hair layer is above the facial makeup layers (e.g., eye shadow, eye liner, blush, lip color and lip liner). Accordingly, many combinations and permutations of layers are available within the preferred embodiments of this invention.

Still referring to FIG. 11, at step S160, the user may use an input device 36 (FIG. 2) to move the item into a desired position over the before picture. For example, the user may use a mouse to move a pair of glasses over the person's eyes. In many cases, the user will then use the resizing tool (e.g., slide bar 212) to change the size of the selected item to a size appropriate to naturally fit the item onto the person in the before picture. The resizing tool allows real-time processing of the scheduled makeover item by instantaneously recreating the graphic in larger or smaller increments as a user increases or decreases the item size with the resizing tool. For example, the user may use the resize slide bar 212 to resize a pair of glasses to a size appropriate to fit the face of the person in the before picture.

Providing the feature of allowing the user to resize the selected item is critical to the preferred embodiment of the invention. Because of this feature, a user can adjust the size of the item to fit nearly any person whose image is displayed within the working area. Therefore, most pictures of a person can be used with this system as a before picture regardless of the size of the subject (e.g., person's face, person's head, person's body, etc.) in relation to the working area. In addition, this resizing feature allows a person to see how an item would look on the person if the item was a different size. For example, after finding a pair of glasses that the client or customer likes, the user can see how the frame would look on the person's face if the frames were a different size.

This benefit is especially important with eyewear. When looking for eyeglasses, it is important to consider both the size of a person's face and the distance between the person's eyes. When glasses are placed on the person's face, the person's eyes should be centered below the lenses. However, persons having similarly sized faces may have eyes that differ greatly in their distance from each other. Therefore, both dimensions should be considered when fitting a person for eyeglasses. This makeover system allows a user to change the size of eyeglasses according to both the size of the person's face and the distance between the person's eyes.

The user may also select other category options or other items for placement over the before picture. If the user selects another item from the same category, the previous item will be erased and replaced with the new item, at step S170. This new item will enter the work area 210, preferably at the same size and position as the item it is replacing. This insertion of the replacement item at the same size and position as the replaced item benefits the user since the user may not need to adjust the replacement item. For example, the replacement item would likely automatically fit the person's face if the replaced item fit the person's face.

If the user selects another category, then the makeover system returns to step S140 and retrieves makeover items of the newly selected category. The makeover items are placed in the item option buttons 220, replacing the previously displayed items that corresponded to the previously selected category. Then the user can select an item, and the makeover system displays the item in the work area 210 at step S150. This newly displayed item can then be resized and moved over the before picture according to user input at step S160.

Figure 10:
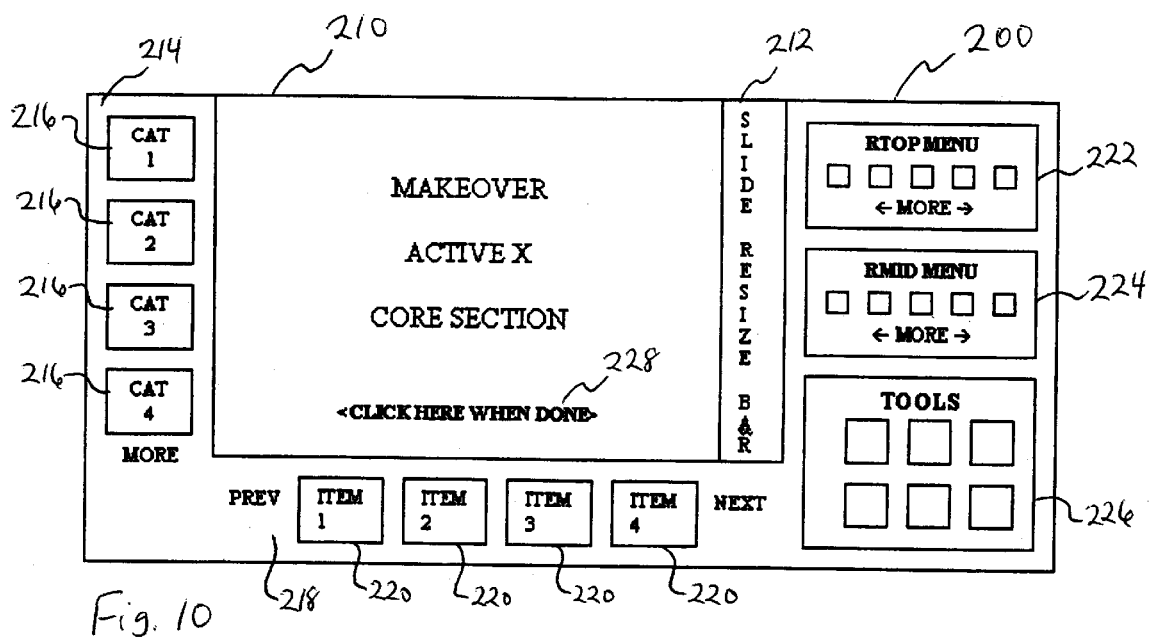
FIG. 10 is a schematic representation of a seventh menu screen of the makeover system in accordance with the preferred embodiment of the invention.

Still referring to FIG. 10, the RTOP menu 222 shows available sub options based on the category selected and product lines listed in the client profile. If the user selects a hair category, the tonal series of hair colors available from the hair product line listed in the clients profile will be displayed. If the user selects a makeup category, a selection of makeup icons will appear reflecting the makeup products available from the makeup line listed in the clients profile. These icons will include items such as, lips for lip colors, cheeks for blush colors, and eyes for eye colors.

The RMID menu 224 shows available sub options based on the RTOP item selected. If the RTOP section is displaying hair colors, then the RMID section will display the available levels in the tonal series selected by the user in the RTOP section. If the RTOP selection is displaying makeup item, then the RMID section will display the available colors in the makeup area selected in the RTOP area.

The tools menu 226 displays the available tools for the category selected. In other words, tools are made available to the user if they are applicable to the respective category or layer that is currently scheduled. If a hair category is selected, then the shear tool and highlighting brush tool will be available in this area. If a makeup category is selected, then a lip brush, a blush brush, an eye shadow brush, and a liner brush will be displayed. The tools menu will preferably be written in a high level graphics language (e.g., visual basic and asp) and will incorporate a communication tool (e.g., executable program, such as an ActiveX component) that provides real-time interaction in the work area.

The tools menu 226 includes a back view icon, an undo tool, a clear tool, a move tool, a shear tool, a highlighting brush and a makeup brush. The back view icon allows the user to view the selected hairstyle from the back. This back picture is a static picture of the selected style from behind and may not have makeover capabilities.

The undo tool returns the most recently changed item to a previous appearance or undoes the most recent change. This tool is beneficial when the user is not satisfied with the most recent makeover change. The clear tool deletes only the layer that the user is currently working on. The move tool permits the user to move or drag an item of a layer around the screen as desired.

The shear tool removes or cuts hair from a selected hairstyle. This tool converts the color of pixels in the hair graphic layer to white which "erases" the hair against a white background. The user cuts the hair by selecting this tool and moving the scissor cursor (e.g., pointer) over the areas of hair to be removed. White is the preferred color for designation as the transparent color in the system to create an erasing appearance.

The highlighting brush allows the user to paint highlights on the selected makeover hairstyle. The user paints on these highlights by selecting this tool and holding down the mouse button to move the brush (eg., cursor, pointer) over the desired areas to highlight. These highlights will be on a separate graphic layer with a predetermined pixel width, opacity, and layer blend to give the illusion of highlights on the hair. Upon the selection of this tool, a set of colors will appear in the RTOP section as default highlighting colors to choose from.

In a preferred embodiment, this highlighting feature is implemented via a highlighting category. The highlighting category adds a layer above the layer corresponding to the category that is to be highlighted, and permitting the user to highlight over the category item.

The makeup brush is similar to the highlighting brush. However, in a preferred embodiment, the makeup brush is applied to a corresponding makeup layer. For example, a lip brush would be applied to the lip color layers, the blush brush would be applied to the blush layer, the eye shadow brush would be applied to the eye shadow layer, and the liner brush would be applied to the lipliner and eyeliner layers. Each brush may vary in pixel width, layer opacity, and layer blend as needed for its specific function. The variations will create the effect of different types of brushes. In an alternative embodiment, the makeup feature is implemented via a separate category similar to the highlighting category. This new category adds a layer above the layer corresponding to the category that is to be modified, and permits the user to modify the appearance of the category item.

If the system administrator desires to add a category or item that is not included in the system database, then the user can link to an administrative panel to add the new category (e.g., facial piercing, mole, mustache, beard) or item (e.g., cowboy hat).

When the makeover is completed, the user selects the exit button 228, and the makeover system formulates an after picture representing a composite image of the superimposed selected overlay items over the before picture and saves the after picture to the user's computer, at step S70. The system displays the after picture onto a finished makeover screen 230, as shown, for example, in FIG. 12. In addition to the displayed after picture, the finished makeover screen 230 preferably includes suggestions (e.g., product recommendations) and information (e.g., color formulation, nearest salon specializing in this hair style) corresponding to the user's selections.

For example, if the user selects a hair color option during the makeover, then preferably the makeover system provides a hair color formulation based on client, or customer's profile. The system also provides hair related selections (e.g., natural level, percentage of gray, desired color) made by the user during the makeover session. Preferably, the makeover system derives the hair color formulations from a system data base in the name of a manufacturer listed in the client's profile. Likewise, the makeover system determines product recommendations, for example, from the manufacturer's data base for the hair color line listed in the client's profile. This formulation is determined based on the client's hair (e.g., hair type, texture). At step S80 (FIG. 3) the makeover system outputs the finished picture screen via the printer 34 (FIG. 2) and exits the system upon request from the user.

Referring back to the exemplary flow overview shown in FIG. 3, if the user selects the consumer version, then the makeover system proceeds to develop a profile of the consumer at step S90. An example of a makeover system consumer profile screen 232 is shown at FIG. 13. This screen is similar to the new client profile screen shown in FIG. 7, but includes fewer profile fields than displayed in the new client profile screen. Fewer profile fields are needed, since a person using the consumer version is likely not to need to enter all of the information requested in the new client profile, such as name, address, phone number and fax number.

The makeover system preferably includes a Cabinet (.cab) file for the executable program. The ".cab" file is a compressed file, containing all of the information necessary to download, install, and register the program and any other dependent components necessary to run in the makeover system. The benefits of this architecture include: file compression for faster download, a single file for ".ocx" and ".inf" files that describes other files required, dependency files, such as Msvbvm60.cab, that will be downloaded only as necessary—thus minimizing download time, easier updating when new versions of your component are created, and an automatic installation when the control component is downloaded.

In a preferred embodiment, the makeover system uses dependency files (e.g., msstkprp.dll, msvbvm60.dll, oleaut32.dll, olepro32.dll, asycfilt.dll, stdole2.tlb, and comcat.dll) to run efficiently. The dependency files will only be downloaded when needed, which will allow the system to load at maximum speed. When the cabinet file is first loaded, it reads information from an ".in" setup file, which supplies the online locations in which the user's computer may download any needed dependency files. This also minimizes the size of the cabinet. Once the cabinet file is downloaded, it preferably installs all the components (e.g., Hair.ocx, JPeg32.dll, mswinsck.ocx) that are needed automatically, with information from the ".inf" setup file.

An example line from the ".inf" setup file is:

[mswinsck. cab_Installer]

file-win32-x86=http://activex.microsoft.com/controls/vb6/MSWinSck.cab

InfFile=MSWinSck.inf

This example line supplies the location of the Winsock control file that the makeover system uses to download images from the web server 22.

Once the cabinet file has been downloaded, it will not have to be downloaded again until a newer version is released. The Executable program file is stored on the user's computer. Preferably, the ".inf" file also contains a digital signature, which is used for security reasons. A match of a digital signature entered by the user with a stored digital signature accessed by the ".inf" file informs the user's computer that the Executable program file is safe for download and use. Therefore, it is not necessary to alert the user if the Executable program may be unsafe since, preferably, the cabinet file is not downloaded until the user passes the security check.

Upon completing the consumer profile, the user can begin his or her makeover session by, for example, selecting the begin makeover button 240. Upon selection of the begin makeover button 240, the makeover system forwards the user to the screen shown at FIG. 8 and proceeds to add a before picture as described above in step S40. The remaining steps for the consumer version of the makeover system are substantially the same as the steps for the professional version discussed above in steps S40 through S80 of FIG. 3 and steps S100 through S170 of FIG. 11. If desired, the finished picture screen shown in FIG. 12 may be modified for the consumer version to include a list of salons or stores that provide the products or services relating to the user's selections of categories and items, as readily understood by a skilled artesian.

This invention also includes a hand tool that positions the current graphical layer within the working area, a back button that rotates the hair style to allow the user to view the back of the hair style, a sheer tool that erases some hair from the overlay, a highlighter brush for painting highlights on the selected makeover hair style, and a makeup brush which is a tint brush used for the eyes, lips, blush, etc.

It should be apparent from the aforementioned description and attached drawings that the concept of the present application may be readily applied to a variety of preferred embodiments, including those disclosed herein. For example, the design of the screens may be altered based on designer preferences, profile information desired, or items/categories selected. Accordingly, if preferred, client information could be modified at different times, such as, upon selection of a client from the client list shown in FIG. 6. In addition, the makeover system may also require a user to login if the user desires to use the consumer version. Under this scenario, a screen similar to the login screen shown in FIG. 5 may be used for access to the consumer version. Therefore, the formats of the menus and screens are limited only by the categories, items, or information desired by the professional or consumer version of the makeover system. Further, it is understood that the screens may include shortcuts to other screens and/or areas of the makeover system to provide the user with more flexibility in moving about the system.

Without further elaboration, the foregoing will so fully illustrate the invention that others may, by applying current or future knowledge, readily adapt the same for use under various conditions of service.

We claim:

1. A method provided by a computer tool that permits a user to modify an overlay item and place it over an image of a person, the method comprising:
displaying a before picture representing the image of the person;
displaying categories of overlay items for selection of one of the categories by the user, the categories of overlay items corresponding to different areas of the person displayed in the before picture;
retrieving the set of overlay items corresponding to the selected one of the categories;
displaying a set of overlay items for selection of one of the items by the user, the set of overlay items corresponding to an area of the person displayed in the before picture;
displaying a selected one of the set of overlay items upon selection of the selected overlay item by the user;
resizing the selected overlay item according to user input to align the size of the selected overlay item with the size of the area of the person;
superimposing the resized selected overlay item on the before picture according to user input such that the item may appear to be worn naturally on the person; and
providing an after picture representing a composite image of the superimposed selected overlay item over the image of the person;
displaying another set of overlay items corresponding to a second selected category of overlay items for selection of one of the items in the set by the user;
displaying a second selected overlay item upon selection of the item by the user;
resizing the second selected overlay item according to user input to align the size of the second selected overlay item with the size of the corresponding area of the person;
superimposing the resized second selected overlay item over the before picture such that the person in the before picture may appear to be wearing the selected item and the second selected item; and
providing an after picture representing a composite image of the superimposed selected overlay item and the superimposed second selected overlay item over the image of the person.

2. The method of claim 1, further comprising, upon selection of a new item different from the resized selected item, displaying the new item on the before picture, the new item displayed having a size adjusted in accordance with the prior resizing of the selected item.

3. The method of claim 1, further comprising rotating the selected overlay item to illustrate the item at a different perspective.

4. The method of claim 1, further comprising erasing a desired portion of the selected item according to user input to modify the shape of the selected item.

5. The method of claim 1, further comprising tinting a desired portion of the selected item according to user input to modify the hue of the desired portion.

6. A method provided by a computer tool that permits a user to modify an overlay item and place it over an image of a person, the method comprising:
displaying a before picture representing the image of the person;
displaying a set of overlay items for selection of one of the items by the user, the set of overlay items corresponding to an area of the person displayed in the before picture;
displaying a selected one of the set of overlay items upon selection of the selected overlay item by the user;
resizing the selected overlay item according to user input to align the size of the selected overlay item with the size of the area of the person;
superimposing the resized selected overlay item on the before picture according to user input such that the item may appear to be worn naturally on the person; and
providing an after picture representing a composite image of the superimposed selected overlay item over the image of the person;
acquiring a profile of the person, the profile including information descriptive of the person and corresponding to the overlay items;
determining recommendations for the overlay items based on the profile and the selected items; and
displaying the determined product recommendations.

7. The method of claim 6, the recommendations including color formulations suggested for use to help the person look like the image provided in the after picture.

8. The method of claim 6, the recommendations including products suggested for use to help the person look like the image provided in the after picture.

9. The method of claim 8, the recommendations including stores that supply the suggested products.

10. A computer tool that permits a user to modify an overlay item and place it over an image of a person, comprising:
means for displaying a before picture representing the image of the person;
means for displaying categories of overlay items for selection of one of the categories by the user, the categories of overlay items corresponding to different areas of the person displayed in the before picture;
means for retrieving the set of overlay items corresponding to the selected one of the categories;
means for displaying a set of overlay items for selection of one of the items by the user, the set of overlay items corresponding to an area of the person displayed in the before picture;
means for displaying a selected one of the set of overlay items upon selection of the selected overlay item by the user;

means for resizing the selected one of the set of overlay items according to user input to align the size of the selected overlay item with the size of the area of the person;

means for superimposing the resized selected overlay item over the before picture according to user input such that the item may appear to be worn naturally on the person;

means for providing an after picture representing a composite image of the superimposed selected overlay item over the image of the person;

means for displaying another set of overlay items corresponding to a second selected category of overlay items for selection of one of the items in the set by the user;

means for displaying a second selected overlay item upon selection of the item by the user;

means for resizing the second selected overlay item according to user input to align the size of the second selected overlay item with the size of the corresponding area of the person;

means for superimposing the resized second selected overlay item over the before picture such that the person in the before picture may appear to be wearing the selected item and the second selected item; and means for providing an after picture representing a composite image of the superimposed selected overlay item and the superimposed second selected overlay item over the image of the person.

11. The tool of claim 10, further comprising, upon selection of a new item different from the resized selected item, means for displaying the new item on the before picture, the new item displayed having a size adjusted in accordance with the prior resizing of the selected item.

12. The tool of claim 10, wherein the means for resizing includes one of a sidebar, directional arrows or indicator buttons.

13. An executable program that permits a user to modify an overlay item and place it over an image of a person, comprising:

a code segment for displaying a before picture representing the image of the person;

a code segment for displaying categories of overlay items for selection of one of the categories by the user, the categories of overlay items corresponding to different areas of the person displayed in the before picture; and a code segment for retrieving the set of overlay items corresponding to the selected one of the categories;

a code segment for displaying a set of overlay items for selection of one of the items by the user, the set of overlay items corresponding to an area of the person displayed in the before picture;

a code segment for displaying a selected one of the set of overlay items upon selection of the selected overlay item by the user;

a code segment for resizing the selected one of the set of overlay items according to user input to align the size of the selected overlay item with the size of the area of the person;

a code segment for superimposing the resized selected overlay item over the before picture according to user input such that the item may appear to be worn naturally on the person;

a code segment for providing an after picture representing a composite image of the superimposed selected overlay item over the image of the person;

a code segment for displaying another set of overlay items corresponding to a second selected category of overlay items for selection of one of the items in the set by the user;

a code segment for displaying a second selected overlay item upon selection of the item by the user;

a code segment for resizing the second selected overlay item according to user input to align the size of the second selected overlay item with the size of the corresponding area of the person;

a code segment for superimposing the resized second selected overlay item on the before picture such that the person in the before picture may appear to be wearing the selected item and the second selected item; and a code segment for providing an after picture representing a composite image of the superimposed selected overlay item and the superimposed second selected overlay item over the image of the person.

14. The executable program of claim 13, further comprising, upon selection of a new item different from the resized selected item, a code segment for displaying the new item on the before picture, the new item displayed having a size adjusted in accordance with the prior resizing of the selected item.

15. A computer data signal that permits a user to modify an overlay item and place it over an image of a person, comprising:

a signal segment for displaying a before picture representing the image of the person;

a signal segment for displaying categories of overlay items for selection of one of the categories by the user, the categories of overlay items corresponding to different areas of the person displayed in the before picture;

a signal segment for retrieving the set of overlay items corresponding to the selected one of the categories;

a signal segment for displaying a set of overlay items for selection of one of the items by the user, the set of overlay items corresponding to an area of the person displayed in the before picture;

a signal segment for displaying a selected one of the set of overlay items upon selection of the selected overlay item by the user;

a signal segment for resizing the selected one of the set of overlay items according to user input to align the size of the selected overlay item with the size of the area of the person;

a signal segment for superimposing the resized selected overlay item on the before picture according to user input such that the item may appear to be worn naturally on the person;

a signal segment for providing an after picture representing a composite image of the superimposed selected overlay item over the image of the person;

a signal segment for displaying another set of overlay items corresponding to a second selected category of overlay items for selection of one of the items in the set by the user;

a signal segment for displaying a second selected overlay item upon selection of the item by the user;

a signal segment for resizing the second selected overlay item according to user input to align the size of the second selected overlay item with the size of the corresponding area of the person;

a signal segment for superimposing the resized second selected overlay item over the before picture such that the person in the before picture may appear to be wearing the selected item and the second selected item; and a signal segment for providing an after picture representing a composite image of the superimposed selected overlay item and the superimposed second selected overlay item over the image of the person.

16. The computer data signal of claim 15, further comprising, upon selection of a new item different from the resized selected item, a signal segment for displaying the new item on the before picture, the new item displayed having a size adjusted in accordance with the prior resizing of the selected item.

* * * * *